(12) United States Patent
Noguchi et al.

(10) Patent No.: US 8,168,435 B2
(45) Date of Patent: May 1, 2012

(54) APPARATUS, METHOD AND STORING MEDIUM FOR A VIRTUAL ROLE PLAYING GAME CONTROL

(75) Inventors: Shinji Noguchi, Tokyo (JP); Yasuyuki Honne, Yokohama (JP); Hiroya Hatsushiba, Chiba (JP)

(73) Assignee: Namco Ltd., Tokyo (JP)

( * ) Notice: Subject to any disclaimer, the term of this patent is extended or adjusted under 35 U.S.C. 154(b) by 1610 days.

(21) Appl. No.: 10/891,017

(22) Filed: Jul. 15, 2004

(65) Prior Publication Data

US 2005/0054402 A1 Mar. 10, 2005

(30) Foreign Application Priority Data

Jul. 17, 2003 (JP) ................................. 2003-198696
Jul. 17, 2003 (JP) ................................. 2003-198697

(51) Int. Cl.
 *A63F 13/00* (2006.01)
 *A63F 1/00* (2006.01)
(52) U.S. Cl. ............................... 436/5; 463/43; 273/303
(58) Field of Classification Search ................ 463/9, 23, 463/33, 5, 43; 273/303
 See application file for complete search history.

(56) References Cited

U.S. PATENT DOCUMENTS

| | | | | |
|---|---|---|---|---|
| 5,662,332 | A * | 9/1997 | Garfield | 273/308 |
| 5,887,873 | A * | 3/1999 | Freeman | 273/303 |
| 6,419,584 | B1 * | 7/2002 | Sakamoto et al. | 463/43 |
| 6,488,582 | B1 * | 12/2002 | Suzuki | 463/31 |
| 7,033,275 | B1 * | 4/2006 | Endo et al. | 463/33 |

FOREIGN PATENT DOCUMENTS

| | | |
|---|---|---|
| JP | 2794230 | 6/1998 |
| JP | 11-207036 A | 3/1999 |
| JP | 2000-014928 A | 1/2000 |
| JP | 2002-035414 | 2/2002 |
| JP | 3343211 | 8/2002 |
| JP | 2002-282540 A | 10/2002 |
| JP | 2003-019355 A | 1/2003 |

OTHER PUBLICATIONS

STIC NPL Search.*
STIC Patent Search.*
V Jump Comics [Game Series] WonderSwanColor (WSC) Edition, Roll Playing Card Game Wild Card Almighty Guide, First edition, Shueisha, Inc. Apr. 3, 2001, pp. 008-009, 022-023, 026-035 and 040-042.
Japanese Office Action date Nov. 27, 2007 of JP application No. 2003-198697.

(Continued)

*Primary Examiner* — Dmitry Suhol
*Assistant Examiner* — Malina K Rustemeyer
(74) *Attorney, Agent, or Firm* — Miles & Stockbridge P.C.

(57) ABSTRACT

An apparatus, method and recording medium for controlling a game where a battle occurs in virtual space between one or more player characters acting according to manipulation of a player and one or more enemy characters acting independently of the manipulation of the player, including a command information storage for storing command information sets which includes a command to a player character and a plurality of numerical values, a card display for displaying a card showing a command included in the command information set or symbols related with the numerical values, and a command input acceptance unit to accept an input which selects the card displayed as well as one of the numerical values or symbols attached to the card.

14 Claims, 5 Drawing Sheets

OTHER PUBLICATIONS

Japanese Office Action dated Jul. 3, 2007 or JP applicaition No. 2003-198697.

V Jump Comics [Game Series] WonderSwanColor (WSC) Edition, Roll Playing Card Game Wild Card Almighty Guide, First edition, Shueisha, Inc. Apr. 3, 2001, pp. 001-145 (especially refer to pp. 040-042).

Apr. 6 issue of Weekly Famitsu, Enterbrain, Inc., vol. 16, No. 14, No. 642 total, Apr. 6, 2001, pp. 76-78.

Dengeki Game Cube, Media Works, vol. 2, No. 11, Nov. 1, 2002, p. 42.

Degeki Game Cube, Media Works, vol. 3, No. 8, Jul. 1, 2003, pp. 116-121.

* cited by examiner

APPARATUS, METHOD AND STORING MEDIUM FOR A VIRTUAL ROLE PLAYING GAME CONTROL

BACKGROUND OF THE INVENTION

1. Field of the Invention

The present invention relates to a game apparatus and game control method implementing games such as a role playing game and a recording medium storing program for executing the method. More specifically, the invention relates to controlling a battle scene in a role-playing game.

2. Background Art

Role playing games are of such a type that a game player advances a story by specifying actions to be taken by a character who appears in the story. In the story, this character (hereinafter referred to as a player character) is given a variety of challenges such as solving a riddle, hunting for treasure and beating an enemy. In the course of the story, the player character encounters many enemy characters and battles with them.

In a battle scene, the player character and an enemy character are displayed on a display screen. If there are a plurality of player characters, they are displayed respectively. Likewise, a plurality of enemy characters are displayed if so. The actions of the enemy characters are predetermined by the game control program.

The game player specifies each player character's action by selecting the action from an action select menu displayed in the screen. The game control program creates an image stream in which the player characters take the actions specified by the game player and the enemy characters take the actions predefined by the game control program. The game control program displays this image stream in the screen. This kind of control method for a battle scene is disclosed in, for example, Japanese Patent Nos. 2794230 and 3343211.

SUMMARY OF THE INVENTION

The present invention proposes a new control method for battle scenes so that the player can enjoy such battle scenes as mentioned above more.

The present invention also proposes a new method to specify the action of a player character so that the player can find more amusement in such battle scenes as mentioned above.

The above object of the present invention is achieved by a game apparatus described below. The game apparatus controls a game where a battle occurs in virtual space between one or more player characters acting according to manipulation of a player and one or more enemy characters acting independently of the manipulation of the player. The game apparatus includes a command information storage unit for storing, for each player character, a plurality of command information sets that are available to the player character. The game apparatus also includes a command candidate selecting unit for selecting, for each player character, one or more command candidates as ones ready to be given to the player character from the command information sets. The game apparatus further includes a status detecting unit for detecting a status in which any one of the player characters is ready to attack or a status in which any one of the player character is selected as an attacking target of the enemy characters. A command input acceptance unit is provided for accepting an input when one of the above mentioned statuses is detected by the status detecting unit. The above mentioned input is performed to select a command to be given to the player character in the detected status from the command candidates. An effect calculating unit is also provided for calculating an effect which is to be produced in the game as a result of the selected command.

The above object of the present invention is achieved by a game apparatus described below. The game apparatus controls a game where a battle occurs in virtual space between one or more player characters acting according to manipulation of a player and one or more enemy characters acting independently of the manipulation of the player. The game apparatus includes a command information storage unit for storing a plurality of command information sets that are available to a player character. The game apparatus also includes a command input acceptance unit for accepting an input to select a command to be given to the player character from the plurality of command information sets. The game apparatus further includes a requirement storage unit for storing a requirement which a combination of a plurality of commands should satisfy in association with another command independent of the plurality of commands. A command information adding unit is provided for adding new command information representing the another command to the plurality of command information sets when a combination of a plurality of selected commands satisfies the requirement.

The above object of the present invention is achieved by a game apparatus described below. The game apparatus controls a game where a battle occurs in virtual space between one or more player characters acting according to manipulation of a player and one or more enemy characters acting independently of the manipulation of the player. The game apparatus includes a command information storage unit for storing a plurality of command information sets each of which includes a command to a player character and a plurality of numerical values. The game apparatus also includes a command input acceptance unit for accepting an input which selects a command information set to be issued to the player character from the plurality of command information sets and also selects one numerical value from the plurality of numerical values included in the selected command information set.

The above object of the present invention is also achieved by a game apparatus described below. The game apparatus controls a game where a battle occurs in virtual space between one or more player characters acting according to manipulation of a player and one or more enemy characters acting independently of the manipulation of the player. The game apparatus includes a command information storage unit for storing a plurality of command information sets each of which includes a command to a player character and a plurality of numerical values. The game apparatus also includes a card display unit for displaying a card according to the command information set. The card shows a command included in said command information set. Numerical values included in the command information or symbols related with the numerical values are discretely attached at corners of the card. The game apparatus further includes a command input acceptance unit for accepting an input which selects the card displayed as well as one of the numerical values or the symbols attached to the card. The input is performed so that a specific corner of the card is selected when viewed from the center of the card.

Other objects and further features of the present invention will be apparent from the following detailed description when read in conjunction with the accompanying drawings.

BEST MODE OF CARRYING OUT THE INVENTION

Specific embodiments of the present invention will be described below with reference to the drawings.

Figure 1:
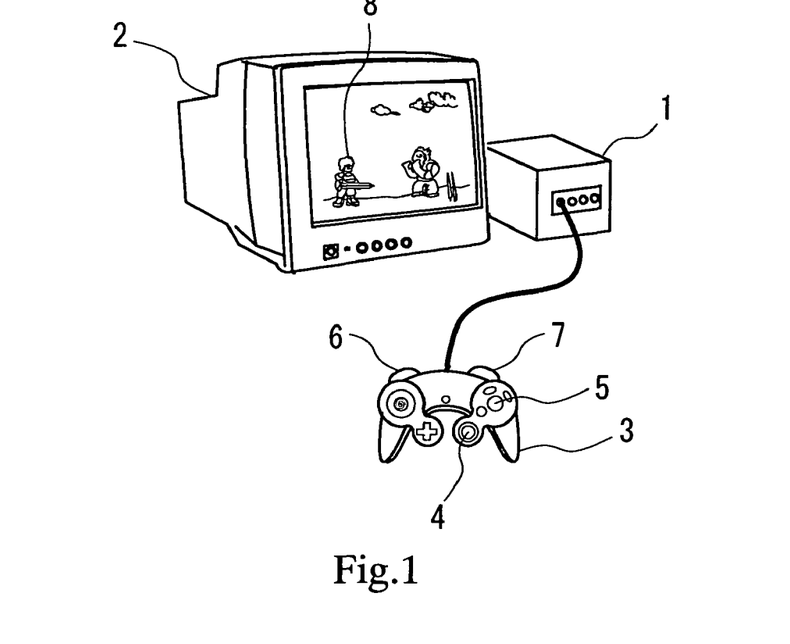
FIG. 1 is an appearance of a game system comprising a home game apparatus and its peripheral devices.

FIG. 1 is the appearance of a game system comprising a home game apparatus and its peripheral devices. The home game apparatus 1 is connected, via a cable shown in the figure, to a home television 2 provided with a display and speaker.

In addition, the home game apparatus 1 is connected with an input device, namely a controller 3 by which the player enters control signals to control a game. The controller 3 is provided with several operation buttons and an operation stick. For battle scenes in a roll playing game described later, the player mainly uses the operation stick 4 and operation buttons 5, 6 and 7 which are shown in the figure. The operation stick 4 is configured so that different operation signals are respectively generated if the stick is tilted up, left, down and right. The operation buttons 5, 6 and 7 are also configured so as to respectively generate different operation signals if they are pushed.

A role playing game, described below, is implemented by the aforementioned home game apparatus 1 which runs the control program of the role playing game. The game's control program is offered to the player as a DVD (Digital Versatile Disc) having the control program recorded thereon. The home game apparatus 1 has a disk tray although no shown in the figure. Setting this DVD in the disk tray and turning on the power supply causes the home game apparatus 1 to run the control program of the role playing game, enabling the home game apparatus to function as a game apparatus according to an embodiment of the present invention. In the foregoing, the control program of the role playing game is a game control program according to an embodiment of the present invention while the DVD is a recording medium according to an embodiment of the present invention.

Figure 2:
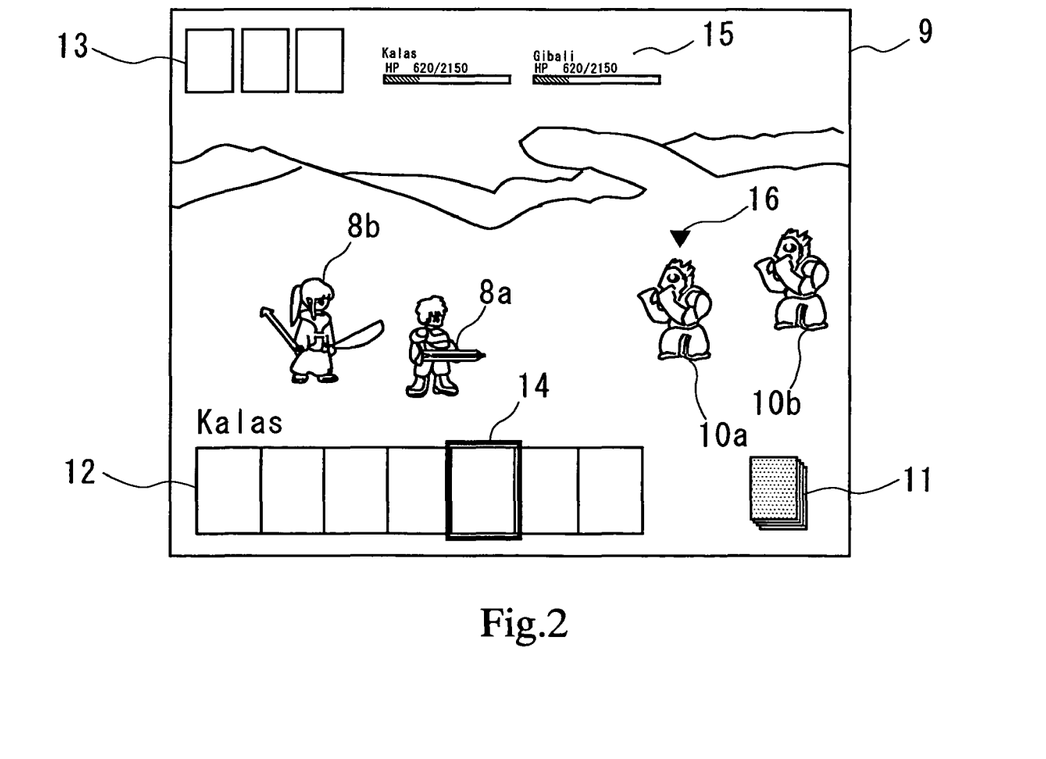
FIG. 2 depicts an example of a battle scene in the role playing game realized by the game apparatus according to an embodiment of the present invention.

FIG. 2 depicts an example of a battle scene in the role playing game realized by this game apparatus or game control program according to the embodiment. In the battle scene, a screen 9 displays a battle between player characters and enemy characters together with information concerning the status of each player character, similar to battle scenes in existing role playing games. In the figure, two player characters 8a and 8b and two enemy characters 10a and 10b are displayed. In an upper area of the screen, status information 15 is displayed for each player character. Also note that the figure shows a situation in which the player character 8a (character name: Kalas) is waiting for a command from the player.

A cursor 16 in the figure points out a target of an action specified by the player. For example, for the player to command the player character 8a to attack an enemy character 10a or 10b, the player positions the cursor 16 to the enemy character targeted for attack as shown in the figure. In addition, for the player to command the player character 8a to use an item to enable the player character 8b or the player character 8a itself to recover, the player positions the cursor 16 to the player character 8a or 8b.

The cursor 16 can be moved by operating the button 6 or button 7 of the controller 3 shown in FIG. 1. If the button 6 is pushed, the cursor 16 automatically moves to either enemy character. Then, pushing the button 6 again moves the cursor 16 to another enemy character. Thus, the player can select a desired enemy character by pushing the button 6 several times. On the other hand, pushing the button 7 automatically moves the cursor 16 to either player character. Then, if the button 7 is pushed again, the cursor 16 moves to another player character. Thus, by pushing the button 7 several times, the player can select any of the player characters including a player character to be given a command.

In conventional role playing games, when a player character is ready to accept a command from the player, an action select menu is displayed for the player character in the screen. In order for the player to give a command to the player character, the player selects an action from the action select menu and then positions the cursor to the target of the action.

In the case of the present role playing game, such an action select menu is not displayed. In the present role playing game, in order for the player to give a command to the player character 8a, the player positions the cursor 16 to a target character and then selects a card representing an action to be taken by the player character.

The following describes how a command is given involving card selection. As shown in, FIG. 2, a row of seven cards 12 is displayed face up in a lower area of the screen 9. These cards 12 are commands that are ready to be given to the player character 8a, that is, they are command candidates. Some cards cannot be selected depending on the battle condition although they are displayed. The cards that cannot be selected and the cards that can be selected are displayed in different colors.

Figure 3:
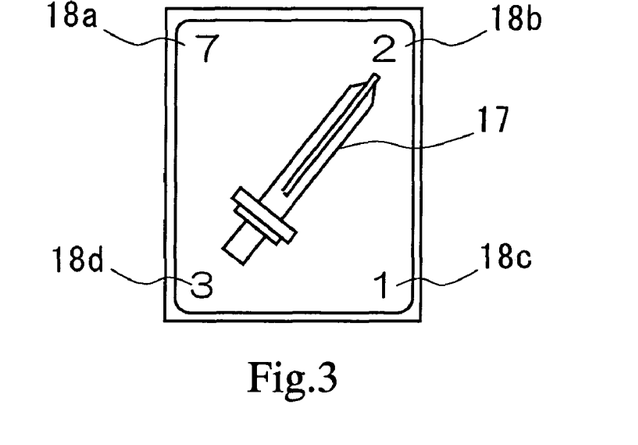
FIG. 3 shows an example of a card employed in the embodiment of the present invention.

FIG. 3 shows an example of a card. As shown in the figure, the card has a pattern 17 symbolizing the command and four numerals 18a through 18d. For example, if the command is to attack with a sword, the pattern 17 represents a sword. Likewise, if the command is to use an item, the pattern 17 represents the item to be used. Alternatively, the command may be described in text instead of a pattern.

Four numerals 18a through 18d are given randomly by the game control program when the game is started or when the card is acquired by the player. Therefore, cards having the same pattern 17 may or may not have different four numeral sets 18a through 18d. In addition, some symbols or marks may be indicated instead of numerals 18a through 18d. For example, heart, diamond, spade and clubs marks may be added respectively to the four corners of the card.

From the cards 12 representing command candidates as shown in FIG. 2, the player selects a command which is to be given to the player character 8a. More specifically, the player sets the cursor frame 14 to some card and selects the card by performing the corresponding operation. The card selected by this operation moves to an upper left area of the screen 9 so as to be displayed there as a card 13 indicating a command to the player character 8a as shown in FIG. 8a. Within a predetermined period of time, the player can successively select a plurality of cards.

Figure 4A:
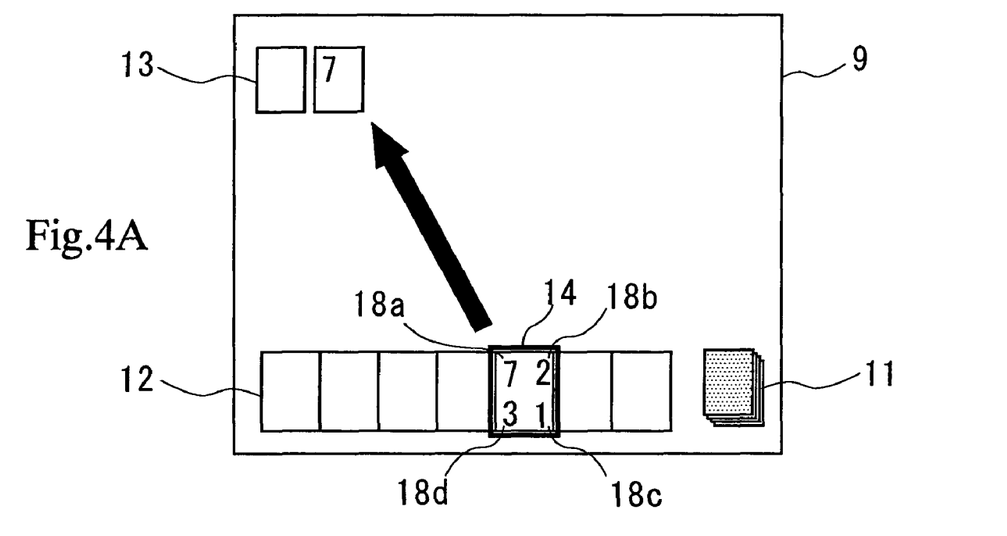
FIGS. 4A and 4B are provided to explain how to select both card and numeral at the same time.
Figure 4B:
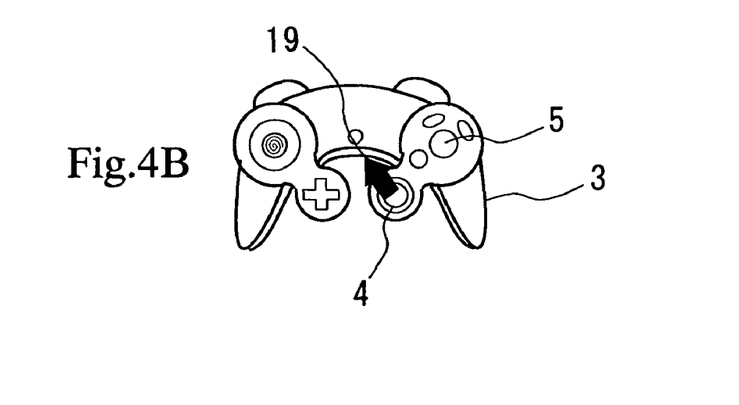

When the player selects the card, the player also selects one numeral from the four numerals 18a through 18d attached to the card. FIGS. 4A and 4B are provided to explain how to select both card and numeral at the same time.

To select both card and numeral at the same time, the stick 4 of the controller 3 is used. As shown in FIG. 4A, with the cursor frame 14 set to a card to be selected, the stick 4 of the controller 3 is pressed down, for example, in the direction of an arrow 19 (upper left direction). In this case, the upper left numeral 18a attached to the card, namely "7", is selected as well as the card. The selected numeral is highlighted on the card 13 indicating the command.

Likewise, if the stick 4 of the controller 3 is pressed down upper right, the upper right numeral 18b on the card is selected. Pressing down the stick 4 lower right selects the lower right numeral 18c while pressing down the stick 4 lower left selects the lower left numeral 18d.

Note that it is also possible to select a card by pushing the button 5 of the controller 3. However, the button 5 can generate only one type of signal. Accordingly, if the button 5 is used to select a card, the upper right numeral 18b on the card is automatically selected.

Alternatively, the configuration may be designed in such a manner that if a card is selected by the button 5, an optimum numeral set will automatically be selected. An optimum numeral set is a set which generates an effect advantageous to the player. The game control program selects an optimum one from a plurality of such sets stored in advance. This selection is made based on the numeral selected initially by the player. For example, when a first button operation selects the upper right numeral "2" designated by 18b, a numeral set which begins with 2 will automatically be selected from the stored numeral sets for a second operation.

In addition, if the player character is in an "upset" state, four numerals are occasionally moved on the card. For example, numeral 18a moves circularly to the position of numeral 18b, position of numeral 18c and then position of numeral 18d. To select a desired numeral in this case, the player must operate the stick 4 of the controller according to its each instantaneous position. If the stick 4 is pressed down in a direction where the numeral is not located, the numeral is not selected but "missed." The skill of the player is challenged.

If cards are selected, the number of cards 12 displayed in the lower area of the screen 9 decreases. The following describes how the area is replenished with cards. In a lower right area of the screen 9, a stack of cards (hereinafter denoted as a deck) is displayed in a face down status. If cards are selected, the card row 12 will automatically be replenished with as many cards. Therefore, seven cards 12 are always displayed in the screen unless the deck 11 is lost.

A deck 11 is organized for each player character. That is, the cards 12 and deck 11 which are displayed when the player character 8a is to be given a command are different from the cards 12 and deck 11 which are displayed when the player character 8b is to be given a command.

Figure 5:
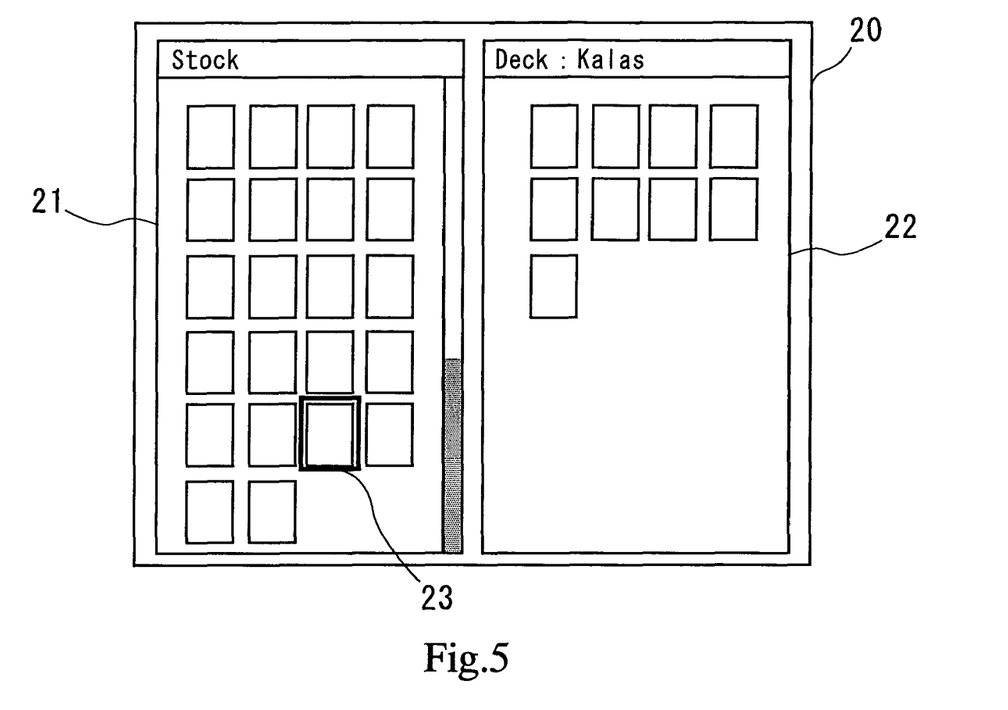
FIG. 5 shows an example of a screen for preparing a deck employed in the embodiment of the present invention.

FIG. 5 shows an example of a screen for preparing a deck 11. As shown in the figure, the deck preparation screen 20 displays all of the stocked cards in the left section 21. Each stocked card is a card either given to the player when the game is started or acquired by the player after the game is started. The stocked cards include cards which can be used as commands only for some player characters as well as those which can be used as commands for any player characters.

In the right section 22, cards which constitute a deck for a player character are displayed. The player positions the cursor frame 23 to a desired one among the stocked cards and performs a selection confirming operation. The selected card is moved from the left section 21 of the screen to the right section 22 of the screen. The player character deck is constituted by repeating this operation. Since 50 cards constitute a deck, the player must repeat this operation 50 times for each player character. However, if the operation is repeated less than 50 times, the game control program automatically selects cards until the deck has 50 cards. If there are plural player characters, the player calls this screen to perform the preparing operation for each player character.

As mentioned earlier, the commands the player can give to a player character are limited to the commands represented by the seven cards which are selected from those constituting the deck 11. The command represented by any stocked card can not be given to the player character unless the card is included in the deck for the player character and displayed as a hand (card 12). This means that whether a player character can have an advantage in a battle depends on not only how commands are given to the player character in the battle but also the composition of the deck.

Then, the following describes three kinds of effects which will be brought about by selecting a card. Firstly, since each card represents a command for the player character, selecting a card will bring about a predefined effect as a consequence of executing the command represented by the card. For example, if the command is to exercise a certain attacking technique, the enemy character will be damaged as predetermined. If the command is to use a certain recovery item, a designated character will recover by using the item.

In the present role playing game, it is possible to display a plurality of cards in an upper left area of the screen 9. In this case, these cards produce a total effect of them rather than respectively producing their effects. That is, the game control program calculates the total combined effect, not individual effects, of all commands given to a player character when the player character is in its turn to act.

It is possible that the selected cards mutually counterbalance their effects. For example, "light attribute" and "dark attribute" are mutually opposite attributes. If a command card of the light attribute to cause a level 100 of damage to an enemy character is selected together with a command card of the dark attribute to cause a level 50 of damage to the enemy character, the level of damage to be given to the enemy character is not 150 but 50.

Figure 6A:
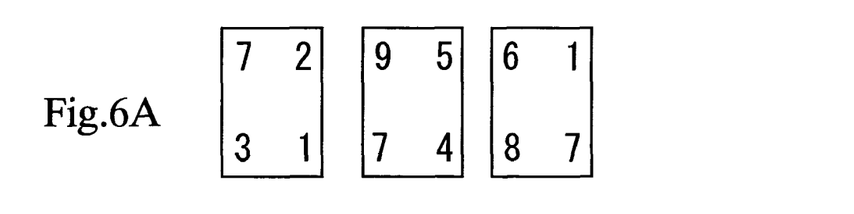
FIGS. 6A, 6B and 6C are provided to explain how a numeral set is selected from a command card set.
Figure 6B:
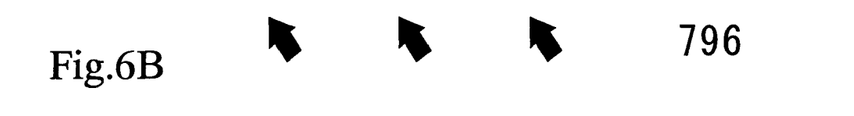
Figure 6C:
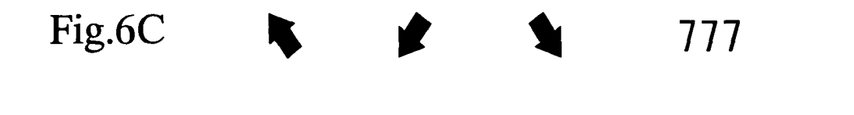

Second effects are effects which will be brought about by numerals selected from cards. As described with reference to FIG. 4, the present role playing game allows the player not only to select a card but also to select one numeral from the four numerals attached to the card. FIGS. 6A, 6B and 6C are provided to explain how a numeral set is selected from a command card set. FIG. 6A shows three cards selected by the player. FIGS. 6B and 6C respectively show two operation sequences of the stick 4 done by the player to select the three cards. Each arrow in FIGS. 6B and 6C indicates the direction of the stick 4 pressed down.

If the player presses down the stick 4 of the controller 3 in the upper left direction three times to select the three cards of FIG. 6A, a numeral set "796" is selected as shown in FIG. 6B. If the player presses down the stick 4 of the controller 3 in the upper left, lower left and lower right directions in this order, a numeral set "777" is selected as shown in FIG. 6C.

Some numeral sets are defined in advance by the game control program so as to produce special effects. For example, each numeral set is checked if it satisfies such requirements as that all numerals be identical, that the numerals appear either in ascending or descending order and that the numeral set is identical to a predefined numeral set. It is desirable to show such requirements to a game player by specifying them in the gaming manual.

If the selected numeral set satisfies any of such requirements as mentioned above, a second effect associated with the satisfied requirement will be generated. This second effect may either complement a first effect or be independent of any first effect. One example of the former second effect is to double the first effect of damaging the enemy. In the latter case, one example is to increase the money possessed by the player character.

Similar to first effects, third effects are effects which will be brought about by command cards combined. However, while first effects have influence on the battle result, third effects do not have influence on the battle result. The third effect is to create a new card by synthesizing selected cards. For example, a card to command the player character to exercise a new technique is created by synthesizing cards which respectively command the player character to exercise specific techniques. It is also possible to synthesize a new card by combining a card which commands the player character to use an item with a card which commands the player character to exercise a technique.

For example, the present role playing game provides "meat" as one of the items to recover the physical strength of the player character. In addition, the attacking techniques the player character can exercise include those of the "fire" attribute. If the selected cards include a "meat" card and a "fire attribute attack" card, a "grilled meat" card is synthesized after the commands represented by the cards are executed. "Grilled meat" can be used as an item to recover the physical strength of the player character similar to "meat" and has a greater recovery effect than "meat".

Requirements for synthesizing cards are defined in advance by the game control program. These requirements may be showed to a game player by specifying them in the gaming manual or any other way. Leaving them unspecified may also be good since the player can enjoy using his/her imagination. However, it is desirable that the description of each item include hinting a possibility of synthesis if the requirements are not specified.

The new cards created by means of synthesis during a battle are listed in the screen after the battle is completed. The player can select one desired card from the displayed of synthesized cards and retain it as a stock card.

The foregoing has described how cards are selected to give commands and what effects are produced by selecting cards. The following provides a description of timing when these cards can be selected.

In an ordinary role playing game, each character's action sequence is determined by the game control program. When it is a player character's turn to act, the game control program displays an action select menu for the player character in the screen to accept a command from the player. Thus, when it is an enemy character's turn, the player cannot give commands to player characters.

In the case of the present role playing game, cards 12 to give commands to a player character are displayed not only when it is the player character's turn to act but also when it is an enemy character's turn to act if the player character is selected as the attacking target of the enemy character.

Thus, unlike in an ordinary role playing game, the player character can take some defensive action if the player character becomes the attacking target of an enemy character. The player character is also allowed to attack the enemy character as means for defense.

Figure 7:
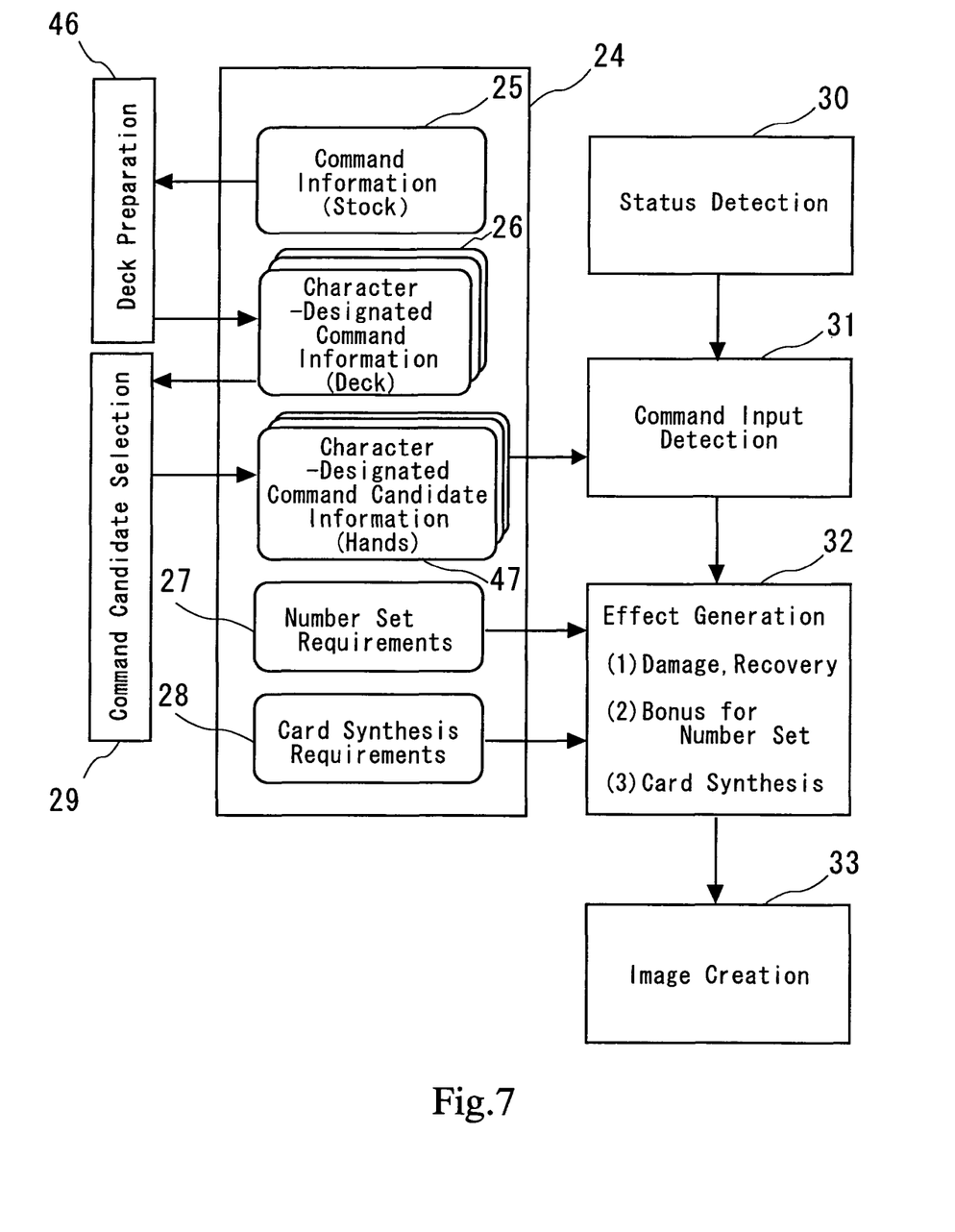
FIG. 7 is a schematic diagram showing functions of the game apparatus which concern the control of a battle scene.

FIG. 7 is a schematic diagram showing the functions of the game apparatus which concern the control of the battle scene described so far. As shown, the game apparatus of the present embodiment has a deck preparation function 46, a command candidate selection function 29, a status detection function 30, a command input acceptance function 31, an effect generation function 32 and an image creation function 33. In addition, the game apparatus has a memory 24 where command information 25, numeral set requirement information 27 and card synthesis requirement information 28 are stored. In the memory 24 of the game apparatus, character-designated command information 26 selected by the deck preparation function 46 and character-designated command candidate information 47 selected by the command candidate selection function 29 are also stored.

The command information 25 is information concerning the stock cards described with reference to FIG. 5. The command information 25 is a data set including the ID of each card, code data describing its command, numerical data indicating the effect to be produced by executing the command (for example, numerical data expressing the level of damage, numerical data indicating the number of points to be recovered, etc.), image data defining a pattern 17 to be depicted on the card and numerical data indicating four numerals 18a through 18d to be attached to the card.

The character-designated command information 26 and the character-designated command candidate information 47 may be either information of copies of the command information 25 sorted for every character or information which associates character name with card ID corresponding to the command information 25. That is, the character-designated command information 26 and the character-designated command candidate information 47 may have any data structure if any deck cards and hands can be identified by referring to the character-designated command information 26 or the character-designated command candidate information 47.

As shown in the figure, the numeral set requirement information 27 and the card synthesis requirement information 28 are stored in the memory 24 as definition data. Those requirements may be defined in the game control program.

The deck preparation function 47 controls the deck preparation screen shown in FIG. 5. Specifically, it reads out the command information 25 from the memory 24 and displays the command information 25 in the left section 21 of the screen 20 as shown in FIG. 5. The function selects cards according to inputs from the controller 3 to prepare character-designated command information 26 and stores the prepared character-designated command information 26 in the memory 24.

The command candidate selection function 29 automatically selects cards from a deck 11 and displays them as cards 12 as shown in FIG. 2. Specifically, the function reads out part of the character-designated information 26 from the memory 24. The function also stores the read character-designated information in the memory 24 again as character-designated command candidate information 47. A predetermined number of cards are selected either sequentially or randomly from the memory.

The status detection function 30 detects a situation in which a player character is ready to attack and a situation in which a player character is selected as the attacking target of an enemy character. Here, a player character is considered to be ready to attack when it is the player character's turn to act. This situation continues until the turn to act is taken by another character. Since characters take their turns to act in a sequence determined by the game control program and the enemies act as controlled by the game control program, these situations can be detected by the game control program.

If either of the aforementioned situations is detected by the status detection function 30, the command input acceptance function 31 reads out character-designated command candidate information 47 concerning the pertinent player character from the memory 24 and displays the information as cards 12. In addition, this function allows the player to select cards and numerals by operating the controller. The cards and numerals selected through this function as described with FIGS. 4 and 6 are displayed as cards 13 in an upper left area of the screen.

If a card is selected by operating the controller, the card row 12 is replenished with another character-designated command candidate 47. The command candidate selection function 29 performs this replenishment by reading out the subsequent character-designated command information 26 from the memory. The screen 9 is controlled by the command input acceptance function 31 so as to always display seven cards 12.

The effect generation function 32 generates the three kinds of effect described earlier. Specifically, it calculates the level of damage to be caused and the number of points to be recovered and calculates the number of points to be obtained if the selected numeral set satisfies a predetermined requirement (calculating effects). Further, it performs processing to add a new card if the selected card set satisfies a predetermined requirement (adding command information).

The command input acceptance function 31 obtains damage/recovery values and other information included in the command information. In the process for calculating the level of damage to be caused and the number of points to be recovered, there are performed procedures for adding up the damage/recovery value of each card and adding or subtracting the sum to or from the target character's parameter.

The numeral set obtained by the command input acceptance function 31 is compared with each of the numeral set requirements 27 read out from the memory 24. If the numeral set satisfies some requirement, parameter values are changed so that the effect stored in the memory associated with the requirement will be produced. For example, if the effect is to double the damage to be caused to the enemy, the aforementioned damage calculation includes doubling of the damage value.

The card set obtained by the command input acceptance function 31 is compared with each of the card synthesis requirements 28 read out from the memory 24 in order to determine whether card synthesis should be performed. If card synthesis is performed, command information corresponding to the synthesized card is stored in the memory 24. Commands corresponding to cards to be synthesized can be offered as, for example, a DVD where the game control program is also recorded. In this case, each time a card is synthesized by the effect generation function 32, the corresponding command is read into the memory 24 from the DVD.

The image creation function 33 creates images which constitute the battle scene. It creates images and outputs them to the display. The effects produced by the effect generation function 32 are shown by these images. For example, they indicate that an enemy character is damaged. In addition, after the battle is complete, this function displays a list of synthesized cards to allow the player to select which synthesized card to stock by operating the controller.

As described so far, this game apparatus and game control program of the present embodiment has the following features and effects.

Firstly, this game apparatus and game control program of the embodiment provides card (command)-related information separately from player character-related information so that the player can freely combine a character with a card by using the deck preparation function. In a conventional game, the commands which can be given to each player character are prescribed. In the case of this game, it is possible to increase the types of commands by getting cards. In addition, the battle result is influenced by what cards constitute the deck. That is, the player can find new amusement in such activities as collecting cards and organizing the deck which are not done in conventional role playing games.

Secondly, in this game apparatus and game control program of the embodiment, the status detection function 30 detects not only a situation in which a player character is ready to attack (in its turn to act) but also a situation in which the player character is set as the attacking target of an enemy character. Thus, a player character can make some defense or counterattack when it is attacked by an enemy character. However, the cards available to the player character are limited to the cards which are selected by the command candidate selection function 29, namely, the cards displayed as hands, using them to make defenses or counterattacks may raise the possibility that the player character will be cornered later. That is, in an environment where the player is given more chances to give commands but the commands which can be issued are limited in versatility and frequency, deliberate consideration is required in determining what commands are to be issued to the player character. Thus, this game is more strategic than conventional games.

Thirdly, in this game apparatus and game control program of the embodiment, each command information 25 includes four numerals which does not depend on the function of the command. When a command is selected, one numeral is selected as well by the command acceptance function 31. If a command set is selected together with a special numeral set, a special effect will be produced. That is, the same card set may produce either a different effect or a combined effect if a different numeral set is selected. Thus, the player can perform card selecting operations in thrilling expectation of an accompanying effect which may be produced by the selected numerals.

Fourthly, in this game apparatus and game control program of the embodiment, a new card is synthesized and provided by the effect generation function 32 if a selected card set satisfies a predefined requirement. In a battle scene, the player can find amusement in using imagination to get a new card by synthesis. For example, if a player character encounters a by far weaker enemy character in an ordinary game, the battle may be so boring. In the case of this game, since even such a match allows the player to enjoy an effort to get a card by synthesis, any battle does not bore the player.

Figure 8:
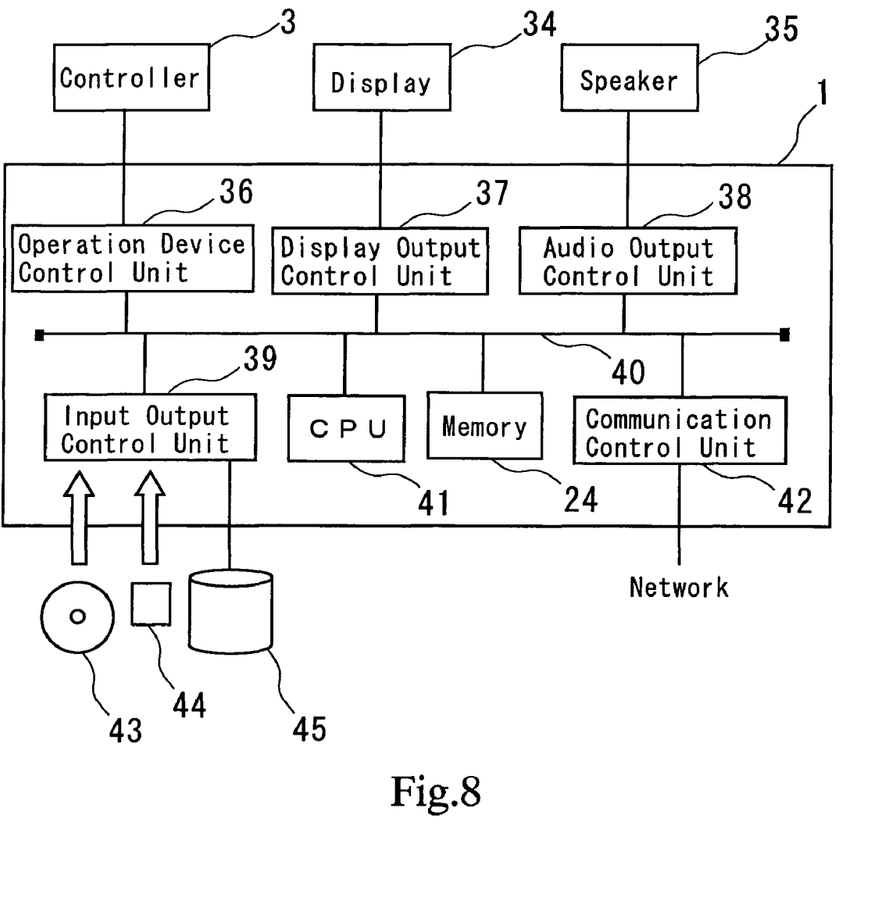
FIG. 8 shows a hardware configuration of the game apparatus according to the embodiment of the present invention.

Lastly, FIG. 8 shows the hardware configuration of this game apparatus of the embodiment, namely a home game apparatus 1. At least, the home game apparatus 1 has a CPU 41, a memory 24, an input output control unit 39, an operation device control unit 36, a display output control unit 37, an audio output control unit 38 and a system bus 40 interconnecting them. Further, a communication control unit 42 may be included which controls connection with a network.

The input output control unit 39 controls data read and data write from and to recording media such as a CD-ROM/DVD 43, a memory card/game cassette 44 and a hard disk 45. The operation device control unit 36 controls input from the controller 3 connected with the home game apparatus 1. The input received from the controller 3 is conveyed to the CPU 41 via the system bus 40. The display output unit 37 controls display of the images output by the game control program on a display 34. The audio output control unit 38 controls output of game sound to a speaker 35.

The game control program, which is read from a recording medium, namely the CD-ROM/DVD 43 or memory card/cassette 44, is stored in the memory 24 via the input output control unit 39 and the system bus 40. Similarly, command information, numeral set requirement information and card synthesis requirement information are stored in the memory 24. Note that the game control program, command information and others may be downloaded and stored in the memory via the communication control unit 42 and the network.

According to the game control program stored in the memory 24, the CPU 41 creates images as output game screens and sends predefined instruction signals and various data to the operation device control unit 36, display output control unit 37 and audio output control unit 38 in order to control exchange of various signals with the controller 3 and output of signals to the display 34 and speaker 35.

The home game apparatus 1 functions as deck preparation means since the CPU 41 performs processing as described below. The CPU 41 acquires command information stored in the memory 24 via the system bus 40 and creates images for a deck preparation screen 20 as shown in FIG. 5. The CPU 41 temporarily stores the created image in the memory 24 or a frame memory not shown in the figure. By controlling the display output control unit 37, the CPU 41 outputs the stored image to the display 34. Further, the signal input from the controller 3 is accepted as card selecting information. Based on this information, an image including the cards added to the deck is created and output by the display output control unit 37.

The home game apparatus 1 functions as command candidate selection means since the CPU 41 performs processing as described below. The CPU 41 reads, via the system bus 40, the first seven ones of the data which are stored in the memory 24 as character-designated information 26 and stores the seven data in the memory 24 as character-designated command candidate information 47.

The home game apparatus 1 also functions as command input acceptance means. Specifically, signals entered from the controller 3 are interpreted and accepted by the CPU 41 as information given meaning by the game control program, namely, information for selecting cards and numerals.

In addition, the home game apparatus 1 functions as effect generation means. Specifically, the CPU 41 acquires numeral set requirement and card synthesis requirement information from the memory 24 via the system bus 40 and performs damage calculation and numeral/card set judgment according to the game control program.

In addition, the home game apparatus 1 functions as status detection means. Specifically, in the process of controlling a battle scene according to the game control program, the CPU 41 performs situation detection processing as prescribed by the program.

In addition, the home game apparatus 1 functions as image creation means. Specifically, the CPU 41 creates images, which include the presentation of the aforementioned effects, and temporally stores the created images in the memory 24 or a frame memory not shown in the figure. Further, the CPU 41 controls the display output control unit to output the stored images to the display 34.

Note that a game apparatus according to the present invention may be implemented not only as a home game apparatus as described so far but also as a general purpose computer such as a personal computer with the game control program installed therein. Implementation as a commercial game apparatus is also possible. In addition, the present invention can be applied to not only role playing games but also any other types of games if a battle between a player character and an enemy character is included. The present invention is useful regardless of hardware configuration and game type.

The major benefits of the present invention described above are summarized as follows:

By controlling a battle scene by a new method, the present invention can provide the player with a new pleasure not available in conventional games.

In a game realized by a game apparatus and game control method of the present invention, information concerning a command is managed in association with a plurality of numerals. When selecting a card, the player can select a numeral at the same time. If a numeral set selected with a plurality of commands satisfies a predefined requirement, an accompanying effect is produced in addition to the original effects of these commands. Thus, the player can perform command executing operations in expectation of an accompanying effect.

The invention claimed is:

1. A game apparatus controlling a game where a battle occurs in virtual space between one or more player characters acting according to manipulation of a player and one or more enemy characters acting independently of the manipulation of the player, said game apparatus comprising:
    command information storage means for storing, for each player character, a plurality of command information sets that are available to the player character and a plurality of numerical values to be selected;
    command candidate selecting means for selecting, for each player character, one or more command candidates as ones ready to be given to the player character from said command information sets;
    status detecting means for detecting a status in which any one of the player characters is ready to attack and for detecting a status in which any one of the player characters is selected as an attacking target of the enemy characters;
    command input acceptance means for accepting an input when one of said statuses is detected by the status detecting means, said input being performed to select a command to be given to the player character in the detected status from said command candidates; and
    effect calculating means for calculating an effect which is to be produced in the game as a result of the selected commands,
    wherein the command input acceptance means accepts the input which selects a plurality of command candidates within a predetermined period of time, and
    wherein the command candidate selecting means replenishes the command candidates with as many command candidates as the selected command candidates from said command information sets instead of the selected command candidates.

2. The game apparatus according to claim 1, wherein the plurality of command information sets includes a command information set which is employed for using a predefined item which appears in the game.

3. The game apparatus according to claim 1, wherein the effect calculating means calculates the effect which is to be produced in the game according to a combination of the plurality of selected commands.

4. A game apparatus according to claim 1, further comprising:
    requirement storage means for storing a requirement which a combination of a plurality of commands should satisfy in association with another command independent of said plurality of commands; and command information adding means for adding new command information representing said another command to the plurality of command information sets when a combination of a plurality of selected commands satisfies said requirement.

5. A game control method for controlling a game where a battle occurs in virtual space between one or more player characters acting according to manipulation of a player and one or more enemy characters acting independently of the manipulation of the player, said game control method comprising the steps of running a computer as:

command information storage means for storing, for each player character, a plurality of command information sets that are available to the player character and a plurality of numerical values to be selected;

command candidate selecting means for selecting, for each player character, one or more command candidates as ones ready to be given to the player character from said command information sets;

status detecting means for detecting a status in which any one of the player characters is ready to attack and for detecting the status in which any one of the player characters is selected as an attacking target of the enemy characters;

command input acceptance means for accepting an input when one of said statuses is detected by the status detecting means, said input being performed to select a command to be given to the player character in the detected status from said command candidates; and effect calculating means for calculating an effect which is to be produced in the game as a result of the selected commands, wherein the command input acceptance means accepts the input which selects a plurality of command candidates within a predetermined period of time, and wherein the command candidate selecting means replenishes the command candidates with as many command candidates as the selected command candidates from said command information sets instead of the selected command candidates.

6. The game control method according to claim 5, wherein the plurality of command information sets includes a command information set which is employed for using a predefined item which appears in the game.

7. The game control method according to claim 5, wherein the effect calculating means calculates the effect which is to be produced in the game according to a combination of a plurality of selected command.

8. A game control method according to claim 5, further comprising the steps of running a computer as:

requirement storage means for storing a requirement which a combination of a plurality of commands should satisfy in association with another command independent of said plurality of commands; and command information adding means for adding new command information representing said another command to the plurality of command information sets when a combination of a plurality of selected commands satisfies said requirement.

9. A game apparatus controlling a game where a battle occurs in virtual space between one or more player characters acting according to manipulation of a player and one or more enemy characters acting independently of the manipulation of the player, said game apparatus comprising:

command information storage means for storing a plurality of command information sets each of which includes a command to a player character and a plurality of numerical values to be selected;

requirement storage means for storing a requirement for a combination of some numerical values to produce a special effect;

command input acceptance means for accepting an input which selects one or more commands to be issued to the player character from said plurality of command information sets and also selects one numerical value from the plurality of numerical values included in each of the selected commands; and effect calculating means for calculating an effect which is to be produced in the game as a result of the selected commands, and the special effect to be produced in the game as a result of the selected numerical values satisfying the requirement of the combination, wherein the command input acceptance means accepts the input which selects a plurality of command candidates within a predetermined period of time.

10. A game apparatus controlling a game where a battle occurs in virtual space between one or more player characters acting according to manipulation of a player and one or more enemy characters acting independently of the manipulation of the player, said game apparatus comprising:

command information storage means for storing a plurality of command information sets each of which includes a command to a player character and a plurality of numerical values to be selected;

requirement storage means for storing a requirement for a combination of some numerical values to produce a special effect;

card display means for displaying a card according to the command information set, said card showing a command included in said command information set, and numerical values included in said command information or symbols related with the numerical values being discretely attached at corners of said card;

command input acceptance means for accepting an input which selects the cards displayed as well as one of the numerical values or the symbols attached to each card, said input being performed so that a specific corner of each card is selected when viewed from the center of each card; and effect calculating means for calculating an effect which is to be produced in the game as a result of the selected cards, and the special effect to be produced in the game as a result of the selected numerical values satisfying the requirement of the combination, wherein the command input acceptance means accepts the input which selects a plurality of cards displayed within a predetermined period of time.

11. A game control method for controlling a game where a battle occurs in virtual space between one or more player characters acting according to manipulation of a player and one or more enemy characters acting independently of the manipulation of the player, said game control method comprising the steps of running a computer as:

command information storage means for storing a plurality of command information sets each of which includes a command to a player character and a plurality of numerical values to be selected;

requirement storage means for storing a requirement for a combination of some numerical values to produce a special effect;

command input acceptance means for accepting an input which selects one or more commands to be issued to the player character from said plurality of command information sets and also selects one numerical value from the plurality of numerical values included in each of the selected commands; and effect calculating means for calculating an effect which is to be produced in the game as a result of the selected commands, and the special effect to be produced in the game as a result of the selected numerical values satisfying the requirement of the combination, wherein the command input acceptance means accepts the input which selects a plurality of command candidates within a predetermined period of time.

12. A game control method for controlling a game where a battle occurs in virtual space between one or more player characters acting according to manipulation of a player and one or more enemy characters acting independently of the manipulation of the player, said game control method comprising the steps of running a computer as:

command information storage means for storing a plurality of command information sets each of which includes a command to a player character and a plurality of numerical values to be selected;

requirement storage means for storing a requirement for a combination of some numerical values to produce a special effect;

card display means for displaying a card according to the command information set, said card showing a command included in said command information set, and numerical values included in said command information or symbols related with the numerical values are discretely attached at corners of said card;

command input acceptance means for accepting an input which selects the cards displayed as well as one of the numerical values or the symbols attached to each card, said input is performed so that a specific corner of each card is selected when viewed from the center of each card; and effect calculating means for calculating an effect which is to be produced in the game as a result of the selected cards, and the special effect to be produced in the game as a result of the selected numerical values satisfying the requirement of the combination, wherein the command input acceptance means accepts the input which selects a plurality of cards displayed within a predetermined period of time.

13. A game apparatus controlling a game where a battle occurs in virtual space between one or more player characters acting according to manipulation of a player and one or more enemy characters acting independently of the manipulation of the player, said game apparatus comprising:

command information storage means for storing, for each player character, a plurality of command information sets each of which includes a command to a player character and a plurality of numerical values to be selected;

command candidate selecting means for selecting, for each player character, one or more command candidates as ones ready to be given to the player character from said command information sets;

requirement storage means for storing a requirement for a combination of some numerical values to produce a special effect;

status detecting means for detecting a status in which any one of the player characters is ready to attack and for detecting a status in which any one of the player characters is selected as an attacking target of the enemy characters;

command input acceptance means for accepting an input when one of said statuses is detected by the status detecting means, said input being performed to select a command to be given to the player character in the detected status from said command candidates and also selects one numerical value from the plurality of numerical values included in each of the selected commands; and effect calculating means for calculating an effect which is to be produced in the game as a result of the selected commands, and the special effect to be produced in the game as a result of the selected numerical values satisfying the requirement of the combination, wherein the command candidate selecting means replenishes the command candidates with a command candidate from said command information sets instead of the selected command candidates.

14. A game control method for controlling a game where a battle occurs in virtual space between one or more player characters acting according to manipulation of a player and one or more enemy characters acting independently of the manipulation of the player, said game control method comprising the steps of running a computer as:

command information storage means for storing, for each player character, a plurality of command information sets each of which includes a command to a player character and a plurality of numerical values to be selected;

command candidate selecting means for selecting, for each player character, one or more command candidates as ones ready to be given to the player character from said command information sets;

requirement storage means for storing a requirement for a combination of some numerical values to produce a special effect;

status detecting means for detecting a status in which any one of the player characters is ready to attack and for detecting a status in which any one of the player characters is selected as an attacking target of the enemy characters;

command input acceptance means for accepting an input when one of said statuses is detected by the status detecting means, said input being performed to select a command to be given to the player character in the detected status from said command candidates and also to select one numerical value from the plurality of numerical values included in each of the selected commands; and effect calculating means for calculating an effect which is to be produced in the game as a result of the selected commands, and the special effect to be produced in the game as a result of the selected numerical values satisfying the requirement of the combination, wherein the command candidate selecting means replenishes the command candidates with a command candidate from said command information sets instead of the selected command candidates.

* * * * *